United States Patent Office 2,767,075
Patented Oct. 16, 1956

2,767,075

PROCESS OF DIRECTLY REDUCING IRON ORE CONTAINING NICKEL

Albert E. Greene, Medina, Wash.

Application March 15, 1951, Serial No. 215,674

3 Claims. (Cl. 75—31)

The present invention relates to the selective reduction of ferrous metal ore or ores such, for example, as oxide ore containing nickel and iron oxides to recover the nickel as an alloy with iron. It relates particularly to ore containing relatively small percentages of nickel but larger percentages of iron whereby some of the iron and most of the nickel are recovered as metal, leaving some of the oxide of iron unreduced.

The invention has for its object the provision of a slag-forming oxide, such as silica, to combine with and hold part of the iron oxide against reduction, and to subject the ore and such slag forming oxide to limited reducing action, so as to recover the nickel as a ferronickel in which the nickel is present in greater proportion to the iron of the alloy, than would be the case if all of the iron and nickel were both reduced and recovered in the alloy metal.

This application relates to the subject matter of certain earlier applications of which the present application is a continuation in part, including Sr. No. 786,039 filed November 14, 1947, now abandoned.

Nickel occurs in ores in combination with iron as oxides or silicates, but usually in small percentages of about 1% more or less in combination with considerably larger percentages of iron, so that when both metals are reduced together the nickel will be present in the alloy in relatively low percentages. It is increasingly desirable to obtain a ferronickel with more nickel in it than possible in such ores. Since nickel reduces more readily at elevated temperatures than iron from their oxide compounds, it is possible to reduce most of the nickel while retaining some oxide of iron unreduced, and thus obtain a higher percent of nickel in the reduced metal alloy. This selective reduction of nickel in preference to iron is accomplished by limited reducing action or by limiting the proportion of reducing agent and subjecting the ore or oxides to the controlled reducing action at the elevated temperatures, whereby most if not all of the nickel is reduced and only part of the iron is reduced.

The discovery I have made relates to the use of an acid oxide compound like silica to combine with and hold part of the oxide of iron against reduction. In the presence of silica in combination with the iron oxide desired only partly reduced, the affinity of the iron for oxygen must be overcome, but also the affinity of the silica for the basic iron oxide must also be overcome. The present invention contemplates the provision of silica to combine with and hold the iron oxide or a portion of it against reduction. Since much of the iron ores in Washington State contain chromium in small percentages the silica also serves to hold such chromium oxide against reduction so that a very pure nickel-iron alloy practically free from chromium and very low in carbon can be recovered by the process of this present invention.

In the case of an ore containing 24% of iron and 2% of nickel, the resulting alloy when all the nickel and all the iron are reduced together would contain about 7.7% of nickel and some 92.3% iron, if nothing else is reduced. To obtain an alloy with twice that much nickel in it, a little less than half the iron oxide would be reduced or a little less than half of the iron in the ore would have to be reduced. Then to hold the balance of the iron as oxide, that is to hold about 11 or 12% of the iron from reduction, and to provide silica to form an FeO.·SiO$_2$ slag with that iron oxide would require a weight of silica roughly equal to the 12% of the weight of the ore. Then the amount of reducing action or reducing agent would be limited, under the reducing conditions which the ore would be subjected to, to about half that necessary to reduce all the nickel and half of the iron present in the ore. If carbon is used as the reducing agent then the theoretical amount of carbon necessary to reduce the nickel oxide and half of the iron oxide would be roughly equal to the weight of the metal to be reduced divided by six—or one sixth of that weight of metal to be reduced. However, any suitable reducing agent could be used in sufficiently limited amount. If still less were used, then less iron would be reduced and a still higher percent nickel in the ferronickel would result. Of course, some reducing agent would ordinarily not be effective, and if carbon were used, the proportion might even be doubled, altho that would only amount to some 4% of the weight of the ore. When chromium is to be slagged, additional silica to combine and hold it against reduction would be added.

An example of the invention will now be given to enable those skilled in the art to use the improvement. This particular application of the invention can be used for the direct reduction of iron ore containing nickel, such as the nickel-iron ore of Washington State, containing some 50% of iron and 1% of nickel together with 1% or more of chromium, some silica (which might be 8%) and small amounts of alumina, magnesia and phosphorus. Such an ore can be reduced to a very pure iron-nickel metal containing practically all of the nickel in the original ore but without reducing all of the iron oxide, and consequently securing a higher percentage of nickel in the direct metal than the percentages in the original ore would be expected to give when all of both nickel and iron are reduced into the alloy metal. Thus, with an ore containing about the percentages of iron, nickel and chromium above set forth, I am able by the process of this invention to carry out the reduction and recover practically all of the nickel, but in percentages in the reduced metal considerably higher than the approximate 2% of nickel which would result when all of the 50% of iron and the 1% of nickel in the ore would be reduced. In this way I have selectively reduced the ore such as above specified and produced a direct nickel-iron containing approximately 6% of nickel and only .04% of carbon and no chromium and practically no phosphorus. To accomplish this I crushed the ore and a limited proportion of solid carbon as reducing agent and a silica flux to form slag with iron oxide and also with chromium oxide desired held in the slag. I am able in this way, using an electric arc furnace, to reduce practically all of the nickel but hold sufficient iron oxide in the slag and make it fusible and more difficult to reduce than if the slag were made of a readly fusible proportion of lime and silica. The process can be continuous, slag being tapped as it collects and more ore charge reduced. The proportion of reducing agent, for example carbon, is regulated to the amount necessary to reduce all of the nickel but only part of the iron from its oxide compounds.

The reduction can be carried out in an ordinary electric arc furnace, and since reduction can be accomplished to a very considerable extent prior to fusion, in charge on top of the bath in the furnace, at which temperature the nickel-iron alloy reduced would not ordinarily be molten, such reduced metal would sink down thru the charge and slag and collect beneath the slag in more or less semi molten or solid condition. Meanwhile, as the slag collects, it can be poured off, and after sufficient metal has been reduced and collected below the slag, it can be superheated and then tapped.

The proportion of solid carbon can be adjusted to reduce the nickel but only part of the iron from the oxide condition. The metal collected is then very low in carbon, as was the 6% nickel-iron which contained only .04% of carbon.

The process of this invention is applicable to the nickel ore containing less iron, and then a higher nickel content in the alloy can be had.

The advantage of the invention is in the reduction of the nickel while holding the oxide of iron against reduction by limiting the reducing action. The invention can be practiced with any suitable reducing agent.

The broad process is applicable also to other metals, such for example as the recovery of manganese from the high silica ores, but in such case, the silica is held against reduction by the use of an oxide compound, such as lime, but the manganese reduced and separated from the slag.

What I claim is:

1. The process of direct reduction of an iron ore containing nickel, said process consisting in providing a bath of molten iron in the hearth of a furnace chamber; preparing charge comprising intimately mixed finely divided ore and solid carbon and fluxing material, the last mentioned fluxing material to slag oxide material of the ore desired not reduced, said oxide material including oxide of iron, holding the oxide of iron as an iron oxide-silicate against reduction; adjusting the proportion of solid carbon reducing agent to reduce the nickel but only part of the iron from their oxides; charging such charge on the molten bath in said furnace chamber; heating the thus charged material and causing substantial reduction of the nickel but only part of the iron; collecting the reduced metal in the bath and subsequently superheating the reduced metal and tapping it.

2. The process of selectively reducing nickel in preference to iron from an iron ore containing a relatively small percentage of nickel compared to the percentage of iron in the ore; said process consisting in preparing charges of the oxide ore crushed relatively fine and solid reducing agent, the last in insufficient proportion to reduce all of the oxide of iron as well as the nickel oxide and providing an acid flux such as silica to hold part of the oxide of iron against reduction making the iron oxide more difficult to reduce but without materially preventing reduction of the oxide of nickel; admitting such charges onto a bath of molten ferrous metal and slag in a smelting furnace; heating the said charge there to accomplish reduction of the nickel while holding oxide of iron in combination with silica in the slag and collecting an iron nickel alloy beneath the slag.

3. The process of selectively reducing nickel in an iron nickel oxide ore, said process consisting in maintaining part of the iron oxide unreduced by providing silica in sufficient amount to combine with the oxide of iron and hold it against reduction; preparing a charge containing the iron-nickel oxide ore, reducing agent and the silica flux; reducing such charge in a suitable furnace such as an electric arc furnace, and reducing the nickel and part of the iron but slagging the balance of the iron as oxide.

References Cited in the file of this patent

UNITED STATES PATENTS

| | | |
|---|---|---|
| 156,739 | Kleinschmidt | Nov. 10, 1874 |
| 578,817 | Grant | Mar. 16, 1897 |
| 1,421,185 | Driscoll | June 27, 1922 |
| 1,819,238 | Greene | Aug. 18, 1931 |
| 1,819,239 | Greene | Aug. 18, 1931 |
| 1,920,379 | Greene | Aug. 1, 1933 |
| 2,098,176 | Udy | Nov. 2, 1937 |